US010929035B2

(12) United States Patent
Dai et al.

(10) Patent No.: US 10,929,035 B2
(45) Date of Patent: Feb. 23, 2021

(54) MEMORY MANAGEMENT VIA DYNAMIC TIERING POOLS

(71) Applicant: SAP SE, Walldorf (DE)

(72) Inventors: Xia-Ge Dai, Shanghai (CN); Guo Gang Ye, Shanghai (CN); Shao-Yi Ning, Shanghai (CN); Guangquing Zhong, Shanghai (CN)

(73) Assignee: SAP SE, Walldorf (DE)

( * ) Notice: Subject to any disclaimer, the term of this patent is extended or adjusted under 35 U.S.C. 154(b) by 76 days.

(21) Appl. No.: 16/038,411

(22) Filed: Jul. 18, 2018

(65) Prior Publication Data

US 2020/0026444 A1    Jan. 23, 2020

(51) Int. Cl.
*G06F 3/06* (2006.01)
(52) U.S. Cl.
CPC .......... *G06F 3/0631* (2013.01); *G06F 3/0604* (2013.01); *G06F 3/0644* (2013.01); *G06F 3/0685* (2013.01)
(58) Field of Classification Search
CPC .... G06F 3/0685; G06F 3/0644; G06F 3/0655; G06F 2212/261; G06F 2212/284; G06F 3/0631; G06F 3/0665; G06F 12/023; G06F 12/0238; G06F 3/0604; G06F 2212/1052; G06F 12/1466
USPC ......................................................... 711/171
See application file for complete search history.

(56) References Cited

U.S. PATENT DOCUMENTS

| | | | | |
|---|---|---|---|---|
| 8,938,571 B1 * | 1/2015 | Vincent | ................. | G06F 12/023 370/429 |
| 2004/0205304 A1 * | 10/2004 | McKenney | ........... | G06F 9/5016 711/148 |
| 2009/0019251 A1 * | 1/2009 | Helman | ................ | G06F 3/0619 711/171 |
| 2009/0019425 A1 * | 1/2009 | Archambault | ........ | G06F 8/4442 717/120 |
| 2012/0260102 A1 * | 10/2012 | Zaks | ................... | G06F 12/1408 713/189 |
| 2013/0212134 A1 * | 8/2013 | S | ......................... | H04L 67/1097 707/827 |
| 2014/0359044 A1 * | 12/2014 | Davis | ..................... | H04L 45/60 709/213 |
| 2017/0235512 A1 * | 8/2017 | Ruchita | ................ | G06F 3/0604 711/170 |
| 2018/0285370 A1 * | 10/2018 | Bhagwat | ............... | G06F 16/122 |
| 2019/0236001 A1 * | 8/2019 | Patel | ..................... | G06F 3/0631 |

* cited by examiner

*Primary Examiner* — Hashem Farrokh
(74) *Attorney, Agent, or Firm* — Sterne, Kessler, Goldstein & Fox P.L.L.C.

(57) ABSTRACT

Disclosed herein are system, method, and computer program product (computer-readable storage medium) embodiments for implementing memory management via dynamic tiering pools. An embodiment operates by initializing a first memory pool of a first tier, and invoking first and second function calls to allocate memory to the first memory pool. Responsive to these function calls, an OS may allocate differently-sized memory elements for attachment to the first memory pool, from a memory free store managed by the OS. A second memory pool, of a second tier, may be further initialized, and a third function call may be invoked, to allocate memory to the second memory pool. Here, in response to the third function call, the first memory pool may reallocate the second memory element from the first memory pool for attachment to the second memory pool.

20 Claims, 8 Drawing Sheets

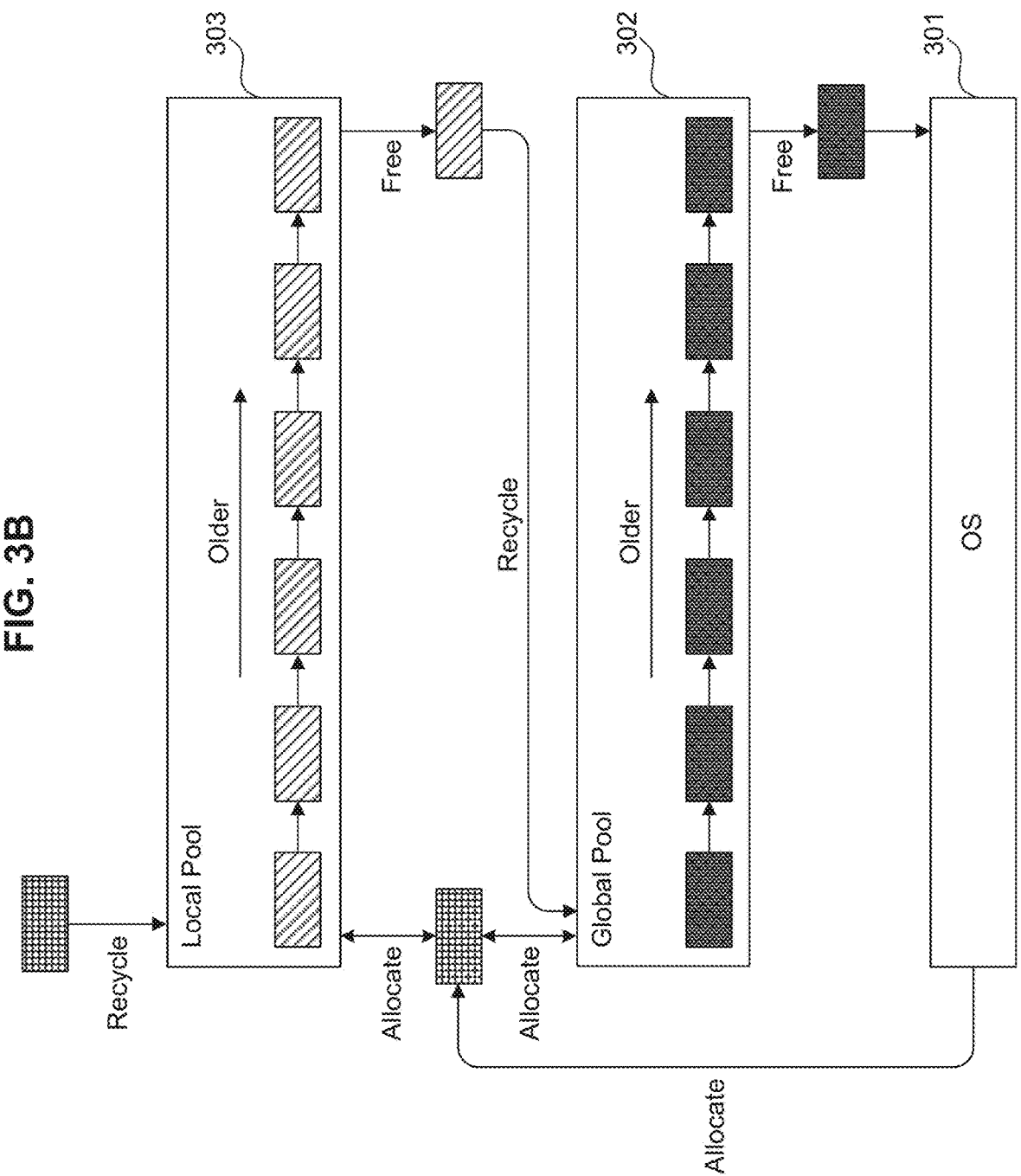

MEMORY MANAGEMENT VIA DYNAMIC TIERING POOLS

BACKGROUND

Platforms for replication and migration of data between database systems may have requirements to maintain replicated data in multiple databases, within certain acceptable levels of consistency of the data and efficiency of operation, while ensuring data integrity.

To replicate across networks, replication servers often use a publish-and-subscribe model to replicate data from a source database (primary database) to at least one target or destination database (replica database). Primary database servers may "publish" data that is available in a primary database, and other (replica) servers may "subscribe" to the data for delivery in a replica database.

Such configurations are not conducive to sharing, as each replication path typically needs its own cache(s) or pool(s), for example. As a result, pool or cache resources essentially become privately dedicated to a single connection with a replication path, even if there is little data overall to replicate. A further stumbling block is that caches and pools may also need to be of a fixed size and pre-allocated. Thus, such a fixed pool or cache is unable to expand when a larger volume of data comes in; likewise, fixed resources in this way are not able to shrink when a corresponding workload becomes lighter.

If a replication server then needs to handle a large number of connections, memory usage may become burdensome, even to an unmanageable degree.

Some modern cloud-computing environments, for example, tend to create conditions that may be overly taxing for database replication as described in this way with respect to replication servers, at least because cloud environments may involve many replication paths. Sizes of pool/cache memory footprints may thus, in many cases, grow excessively large and unwieldy, thereby impeding sustainable scale-out of database replication servers.

BRIEF DESCRIPTION OF THE DRAWINGS

The accompanying drawings are incorporated herein and form a part of the specification.

FIGS. 3A and 3B are diagrams showing additional examples of dynamic tiering pools with multiple tiers, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for implementing memory management via dynamic tiering pools. More specifically, in some embodiments, the memory management via dynamic tiering pools described herein may further relate to enhanced techniques of database replication, which may, in some embodiments, be managed with a database management system (DBMS), integrally or as at least one separate system component, for example.

Figure 1:
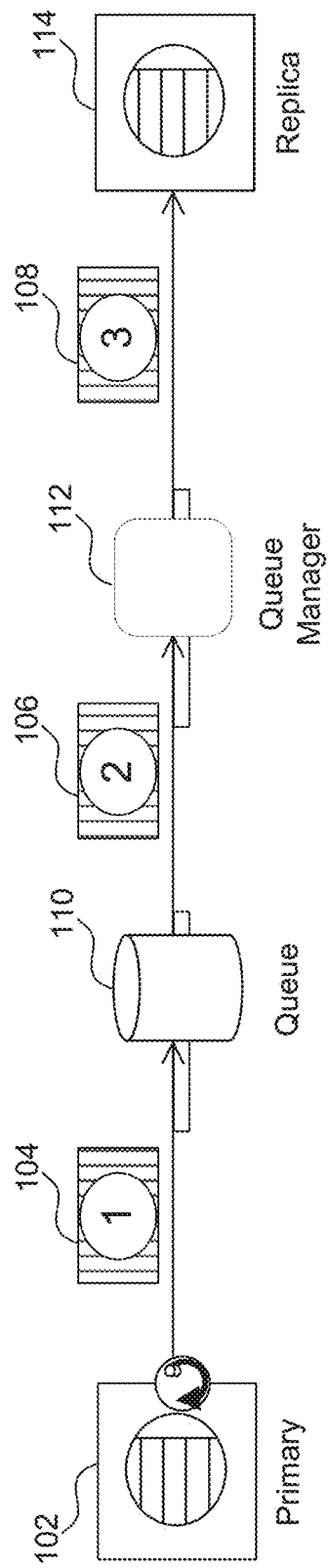
FIG. 1 is a diagram of a database replication architecture, according to some embodiments.

One non-limiting example of a particular replication server that may benefit from the enhanced techniques described herein is depicted in the example of FIG. 1. An accompanying description of FIG. 1 follows in the paragraphs below.

FIG. 1 is a diagram of an example replication path 100 according to a replication server framework, according to some embodiments. Specifically, shown here is a primary database server 102 (primary) and replica database server 114 (replica) at two particular ends. Although FIG. 1 shows one PDS and one RDS, any number of replicas may exist for any given primary, in some embodiments. In further embodiments, a replication system may further include other primary database servers for different databases to be replicated, for example.

To illustrate an example of a data flow through the replication path 100 shown in FIG. 1, data may be read from primary 102 and fed to any number queues 110 and any number of queue managers 112, taking a form of queued data. Queues may have various properties, such as persistent, stable, real-time, etc., and the corresponding queue managers may implement special management functionality depending on the properties of corresponding queues. Queued data may include records, transactions, tables, or any part or combination thereof. Queued data may then be applied to at least one replica database such as that of replica 114, in accordance with any replication technique supported by the replication servers in the replication path 100.

This example data flow through replication path 100 may use pooling and caching mechanisms in the replication framework in order to improve throughput of the replication, in many cases resulting in full use of system resources of many system elements. To this effect, further illustrating data flow through replication path 100 of FIG. 1, additional elements are shown: (1) pool 104 to facilitate receiving data from primary 102, (2) block cache 106 to increase input/output (I/O) performance of queue manager 112, and (3) command cache 108 to direct replication of queued data to replica 114. While numbers are assigned in FIG. 1 for ease of illustration and identifying elements, this numbering does not necessarily create any specific order or priority. Any number of instances of each element may be used in a given replication path, including omission of any or all of these elements, in some embodiments.

These pools and caches may be configured per connection, in some embodiments, resulting in each replication path having its own unique pools and caches, which cannot be shared across different replication paths. Thus, for multiple primaries, replicas, and/or unique replication paths may often have large quantities of redundant elements and duplicated data in memory. Moreover, these pools and/or caches may be, depending on common implementations, pre-allocated and of fixed size. It follows that if a replication system manages large numbers of connections, memory usage of their respective pools and caches may also expand by a large factor accordingly, For example, if a given pool size is 100 MB, and if the block cache and command cache can be configured to use a combined 500 MB, each replication path would then need at least 600 MB (100 MB+500 MB) just for these three performance-improving elements. By extension, in a use case implementing twenty similar replication paths, even for a single instance of a replication server, for example, then the memory usage will be about 12 GB, Given the nature of such pooling and caching, these memory requirements become a baseline for a given level of performance, regardless of any quantity of data to be replicated.

By contrast, using enhanced techniques including memory management via dynamic tiering pools as described herein, the same replication operations may be carried out with the same levels of performance, but with significantly less overhead in terms of resources (e.g., memory footprint), further allowing for additional scalability and performing replication work more efficiently to allow more work with the same resources. Additional advantages of the enhanced techniques described herein may become apparent to those skilled in the art.

To overcome disadvantages associated with resources being non-shared and forced into certain size constraints, at least one different type of pool may be created, having at least some of the following characteristics:

Sharable: A pool may be shared among multiple clients or servers (primaries), across multiple replication paths.

Dynamic: The size of a pool may be varied dynamically in response to workloads, so that the pool may be able to enlarge and shrink in allocated size according to workload.

Tiering: A pool may have a parent pool which is shared with other pools. This type of sharing may further benefit from other efficiencies of inheritance or hierarchical models.

This new type of pool with these features may be called a dynamic tiering pool (DT pool). With this design, memory usage of pool/cache may be significantly reduced, for some embodiments, where replication servers may manage large numbers of databases. Further, in many cases, there is little if any performance penalty, while the relative gain in available resources may be significantly more valuable.

Additional enhancements further improving upon implementation of DT pools may include at least one of aging and lock-free mechanisms:

Aging: Elements in a pool may be evicted based on a defined age of each element.

Lock-free: A lock-free mechanism may be implemented to facilitate sharable pools.

Figure 2:
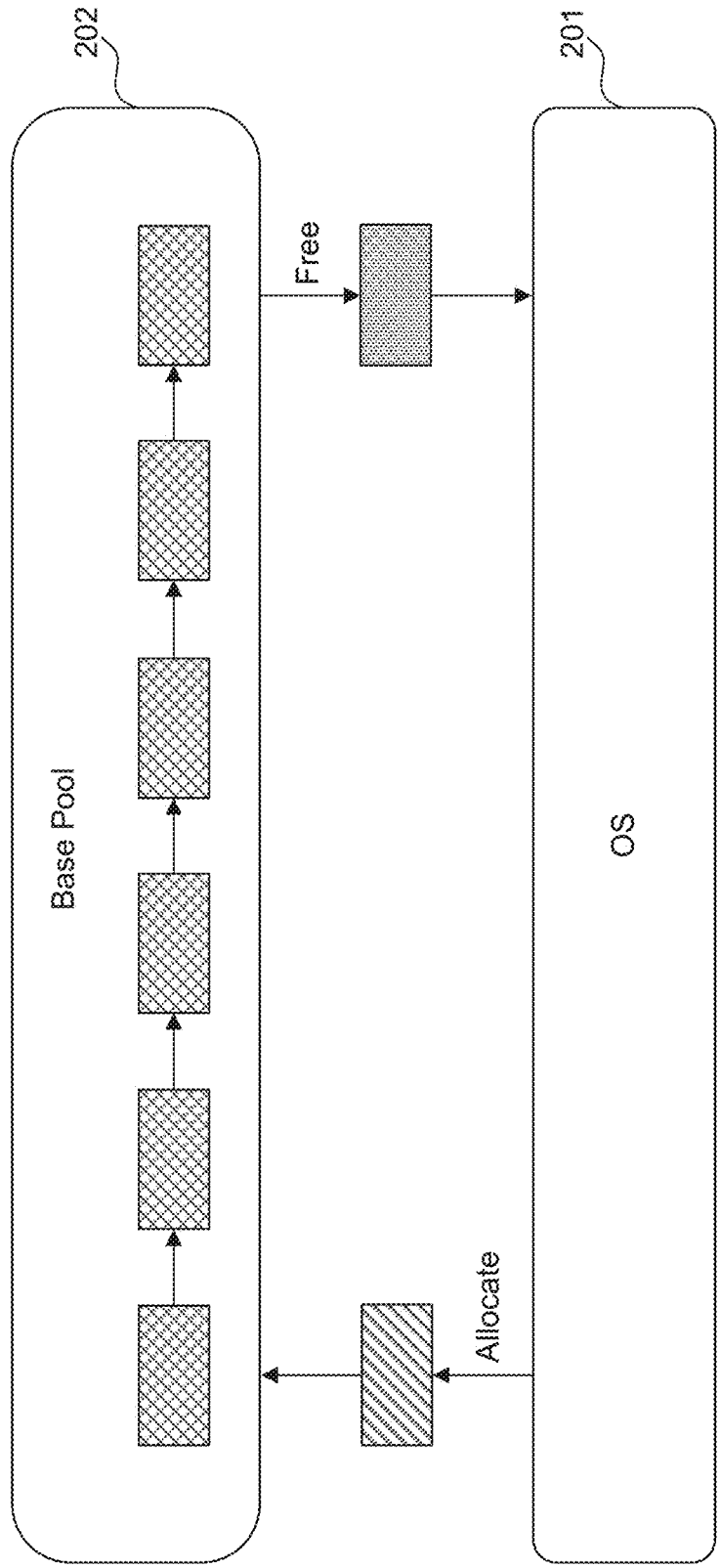
FIG. 2 is a diagram illustrating a dynamic tiering base pool, without showing additional tiers, according to some embodiments.

FIG. 2 is a diagram illustrating a dynamic tiering base pool, without showing additional tiers, according to some embodiments.

An example implementation of a DT pool may include at least a data structure, such as a linked list. In some embodiments, the linked list data structure may be a doubly linked list, among other possibilities for versatile data structure types, including but not limited to arrays, stacks, queues, etc., to name a few non-limiting examples. The data structure(s) of the DT pool may serve as a container of objects, such as packages, for example (see FIG. 5). The objects may be, in some embodiments, data in a certain form to be replicated, for example. As shown, FIG. 2 illustrates an example architecture of a DT pool at a base level without additional tiers, As shown, at a general level, memory may be allocated, such as by an operating system (OS) from a heap of free memory (free store) to be dynamically allocated, for example. This action corresponds to the left-hand side of FIG. 2, with arrows pointing away from OS 201 toward base pool 202. In response to workload demand, the allocation of memory may not only be performed, but the memory may also dynamically sized also in accordance with workload demand, not necessarily limited to any fixed size based on any pool itself. This entire process of dynamic allocation and dynamic sizing may be configured to be run automatically, such as by at least one computer processor, in some embodiments.

When the allocated memory is no longer needed, such as when work completes, memory may be freed, as shown on the right-hand side of FIG. 2, with arrows pointing away from base pool 202 and back toward OS 201. Additionally, or alternatively, existing memory allocations may be reallocated, recycled, and/or resized in an orderly fashion, to ensure efficient use of allocated and free memory depending on workload demand and responsive to available resources, and also depending on performance considerations including any overhead incurred by reallocating, recycling, or resizing allocated memory.

The shaded boxes shown represent memory specifically allocated for elements, such as data structures, which may contain packages, as stored objects for example. The base pool 202 as used for this purpose thus corresponds to pool 104 of FIG. 1. These packages by themselves may include their own specified format internally, as shown by way of example in FIG. 4. Objects, such as packages, within this data structure may be ordered or reordered according to any specified scheme, such as for storage and/or eviction of elements in the pool, for example. An example of such a specified scheme may include the aging as further described herein.

Some embodiments may involve more complexity in implementing replication architecture elements. Nonetheless, any resulting improvements in usability for replication system developers or database administrators may outweigh any added complexity, in terms of performance, value, and other metrics. Other advantages may be further apparent from discussion of sonic of the corresponding implementation details of the enhanced techniques described herein, as described further below.

In replication frameworks or replication systems having use cases in which replication servers may need to handle dozens of replication paths, memory usage may still grow relatively high if there need to be at least three times as many pools or caches as replication paths (e.g., pools, block caches, command caches, etc., as described above) in embodiments that require a copy of each of these elements (at least) per replication path.

On the other hand, in such heavy use cases, if all replication paths share just one global pool for user data and one global block pool for queue management, the access contention may become an issue and harm performance. A tiering approach, with multiple tiers of pools, may be helpful not only to control memory usage, but also to mitigate access contention.

Figure 3A:
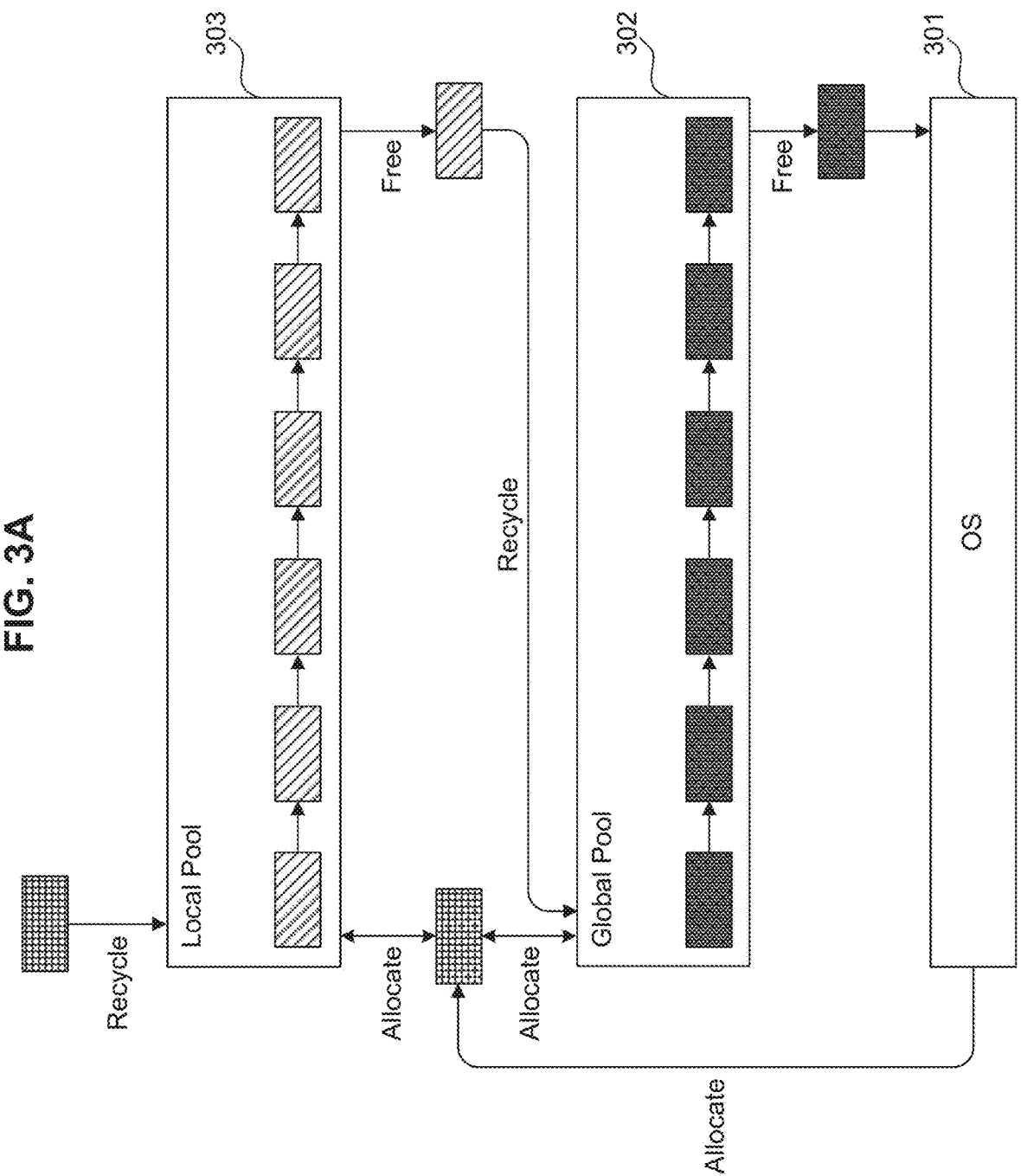

Tiering with multiple levels shall now be described further with respect to FIGS. 3A and 3B that show additional examples of dynamic tiering pools with multiple tiers, according to some embodiments. FIG. 3A includes a tier with a global pool and a tier with a local pool. FIG. 3B includes the same hierarchical structure and layout as in FIG. 3A, also implementing an age-based eviction feature as shown with elements (corresponding to packages) in each pool being sorted by relative age within each respective pool.

In FIGS. 3A and 3B, as shown similarly in FIG. 2, an operating system (such as OS 301, corresponding to OS 201) may be configured to allocate free memory dynamically, such as from a free store. From there, an element may be allocated to any tier of DT pools, directly or by way of another DT pool, for example. More specifically, in some cases, memory may be reallocated or recycled from one pool to another, according to some embodiments.

In the tier closest to the memory free store (heap) or initial allocator, in this case, OS 301, global pool 302 may function similarly to base pool 202 of FIG. 2. However, additional considerations may come into play with another tier at the next level. For example, a subsequent tier may have a local pool 303, which may allocate different memory elements, either newly from the free store or else allocated (or recycled, as shown at top) from global pool 302. The elements in any data structure(s) of local pool 303 may be passed in from external sources (e.g., primary 102), or moved or copied from global pool 302, in some embodiments, depending on workload demand.

In any event, such allocation may be used to improve resource usage at least as a result of dynamic sizing of memory elements and/or being shared among multiple replication paths (see FIG. 1 and accompanying description above), because elements may be intelligently and dynamically sized and resized within each pool, using less memory overall per pool (a benefit of dynamic sizing), and the entire pool structures would not need to be copied for each unique replication path separately (a benefit of sharing).

Properties of each pool and replication path may be inherited from one tier to another, e.g., from the global pool to the local pool, in some embodiments, to provide a non-limiting example. Thus, a set of properties in a second tier may encompass properties inherited from a first tier as well as properties unique to the second tier, forming a superset of properties of the first tier. In some scenarios, bidirectional inheritance may be appropriate depending on instances and workloads. In other embodiments, inheritance may work in the opposite direction. A hybrid approach may involve, for example, where a global pool may be shared and dynamically sized, but where at least some local pools may be private and/or fixed-size pools, depending on workload(s) for any given instance. The tiering and inheritance capabilities may allow for such flexibility to provide for system configurations to improve resource usage generally while still ensuring higher performance for designated workloads at any cost, allowing for priority designations for more valuable workloads, for example.

By way of an example showing one non-limiting implementation of dynamic tiering pool architecture, after a DT pool (e.g., local pool 303) is created, an attachment function (dt_pool_attach) may be called to bind it to another DT pool (e.g., global pool 302). It may also be possible for multiple local pools may be attached to same global pool. With such an architecture having multiple tiers beyond the OS, behavior of other related operations (e.g., malloc and free) may also require different function calls to implement more sophisticated handling at the DT pool level, so as to account for dynamic sizing, tiering, and other features. For example, allocation to (and between) pools may be handled by a function such as dt_pool_init, and dt_pool_free may also be needed.

In some embodiments, by way of further example, if a client calls a dt_pool_get function to fetch an object from a local pool, an object or element address may be returned to the client if there is any element in the pool. If the local pool is empty, dt_pool_get may attempt to retrieve an object from the global pool. If there is any element in the global pool, such object may then be returned to local pool, and then also returned to client, according to an embodiment. If the global pool is also exhausted, local pool may get an element allocated from the memory free store by the operating system (e.g., OS 301) and may then return the element address to client. For any of the examples or embodiments shown herein, elements or objects may be returned by copy or by reference (indirection), for example. In some embodiments, dt_pool_functions may only return pointers to memory elements in pools, whereas other configurations may allow return of pointers and/or copies of other designated data or metadata, for example.

In some embodiments, an object may be recycled to local pool via dt_pool_free. If the number of elements in local pool 303 exceeds the capacity of the local pool 303, some elements may be moved to global pool 302 automatically. If the global pool 302 also becomes full, some elements may then be freed to OS 301, and may thus be returned to free store (not shown). Similarly, operations such as dt_pool_evict and dt_pool_purge may also behave differently. Objects in local pool 303 may first be evicted to global pool 302, then corresponding elements may be freed to OS 301 if necessary.

With this tiering pool, replication system performance may be improved, at least by sharing resources from a global pool, such as global pool 302, if not also from sharing at the local pool level, such as from local pool 303 and similar instances elsewhere. In some use cases, when a client has a regular workload, its local pool can serve it well enough not to need any resources from the global pool. However, when the same workload becomes heavy, that workload may then get elements from global pool. When the same workload lightens or decreases, its elements may be recycled to the global pool, where other clients may use them.

Replication systems supporting dynamic tiering pools may also support an application programming interface (API) in order to interface with DT pools. For example, a corresponding replication system may provide a public API for client software. This exemplary public API may define at least the following functions in Table 1:

TABLE 1 dt_pool_init
dt_pool_free
dt_pool_get
dt_pool_evict
dt_pool_purge
dt_pool_attach
dt_pool_detach
dt_pool_destroy A DT pool may be initialized by calling dt_pool_init. After initialization, a client may call dt_pool_get to fetch an object from the pool and dt_pool_free to return an object to the pool. To evict or purge some elements from the pool to free memory, dt_pool_evict or dt_pool_purge may be called. To release all elements and the pool itself when the pool is no longer required, a client may call dt_pool_destroy. Some of these functions may further facilitate dynamic sizing, as described in more detail below.

DT pools may employ initial size (init_size) and capacity (capacity) parameters to manage the lifecycle of elements within DT pools. For example, when a client calls dt_pool_init to initialize a pool, objects of size init_size may be created and initialized using a specified object constructor. When a client calls dt_pool_get to fetch an object from a pool, the first element may be returned if there is any element in the pool. If the pool is empty, the dt_pool_get function may allocate an element from the operating system (e.g., OS 201 or OS 301) and initialize the element with a specified object constructor before return an address of the element to the client, in an embodiment.

When an object is not required by client, dt_pool_free is called to return it to the pool. If the number of elements in a pool exceeds the pool's capacity, some elements may be evicted to OS automatically. Eviction may be used to reduce the pool size to init_size. A client may directly call dt_pool_evict to shrink a pool to its init_size any time.

As described above, the size of DT pool may be configured to vary dynamically with workload. When there is a heavy workload, such as with many requests for objects, a DT pool may grow up to its full capacity. When all objects are returned, it may then shrink its size to init_size. Thus, unlike fixed-size (static) pools, DT pools reduce wasted memory.

Additionally, data structures for elements themselves may be defined in an API, for example. Corresponding definitions and descriptions are provided below with respect to FIG. 4 and Table 2.

Figure 4:
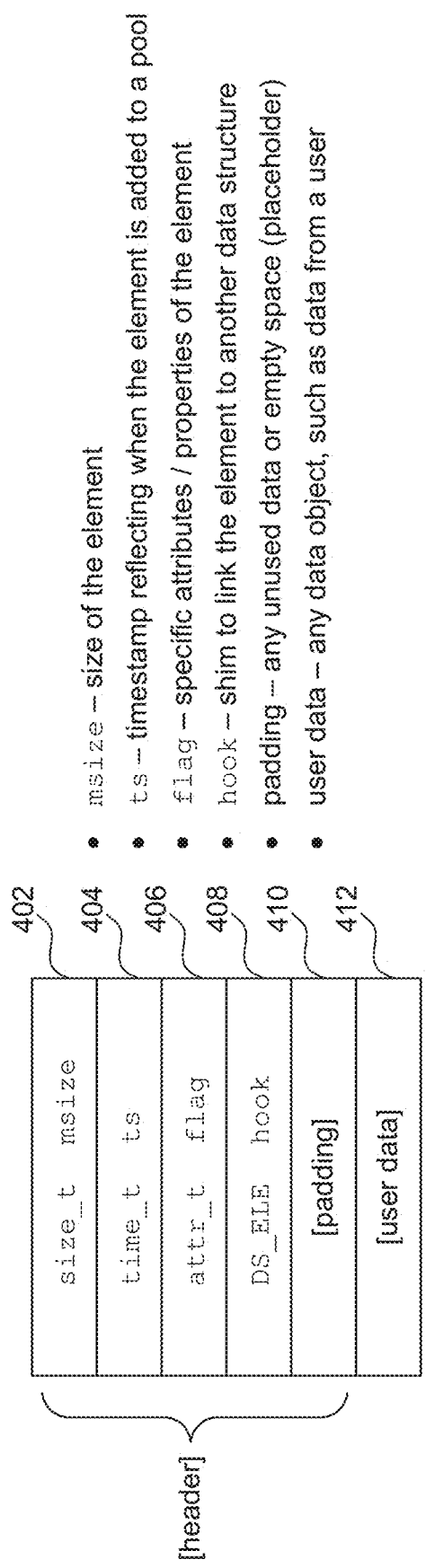
FIG. 4 is a diagram illustrating an example of an internal data structure for an element in a pool, according to some embodiments.

FIG. 4 is a diagram illustrating an example of an internal data structure for an element in a pool, according to some embodiments.

Certain metadata may be useful for successful dynamic allocation and resizing of pool elements—that metadata may, in some embodiments, be stored in a header structure with user-specified object data within an element. Together with the header and object, the combined metadata and data within an element may constitute a user data object, such as a package.

Any number of elements may form a pool. In common usage, an element may also refer to the data within the element, and a package may sometimes refer to multiple elements together, which may be part of a larger element in a data structure such as a queue or linked list, for example. A skilled artisan may appreciate that, throughout this specification and in common usage, references may be made to allocating, deallocating, fetching, etc., for any element, object, or package interchangeably, when in the context of specific actions, without departing from the scope and spirit of this disclosure.

An example set of header definitions for DT pool elements is listed in Table 2:

TABLE 2

| | |
| --- | --- |
| size_t msize | size of the element |
| time_t ts | timestamp reflecting when the element is added to a pool |
| attr_t flag | specific attributes or properties of the element |
| DS_ELE hook | shim to link the element to another data structure |

Header definitions for DT pool elements are not limited only to those shown in Table 2; rather, this table serves as an example definition of header elements. Such an example definition may also be published, such as in a public API, for example.

One part may specify the size of the element—this may be an offset. In systems for which size quantities do not have a predefined type, any unsigned integer value may be sufficient, within boundaries pertinent to the given replication systems on which the DT pools are to be implemented. While this part may not be necessary in systems for which all elements are of a fixed size, having a size value in an element header may be generally treated as a safe practice and may especially facilitate dynamic sizing with dynamic allocation.

Another part may be a timestamp reflecting when the corresponding element was added to a pool. Although this part may also not be necessary in all implementations, the timestamp may be used, for example, in age-based eviction schemes, for some embodiments. Separately, a field of flags may also be helpful to define any other attributes or properties, for an element and/or for a corresponding pool. Such attributes or properties may be checked and/or set, for example, when applying inheritance from one tier to another tier of DI pools. Such flags may also be utilized with other schemes for freshness and/or concurrency, for example. The flags may specify timeout settings for aging.

The hook field may be available as a shim to interface the element with another type of data structure element. For example, the hook may be used to link the element with a linked list (or doubly linked list), for example, with type LL_ELE.

Also shown in FIG. 4, the header may contain a space for padding. Padding may refer to any unused data or empty space, which may serve as a placeholder for other data or metadata, or in some embodiments, to ensure alignment with specific boundaries in memory. Outside of the header within the element may be any data, such as user data, which may also be referred to as an object. Other metadata may be added in the header or between the header and object, as shown by way of the examples of FIG. 5. Also, the user data or object may further include commands, such as replication commands, further shown by way of example in FIG. 5.

Figure 5:
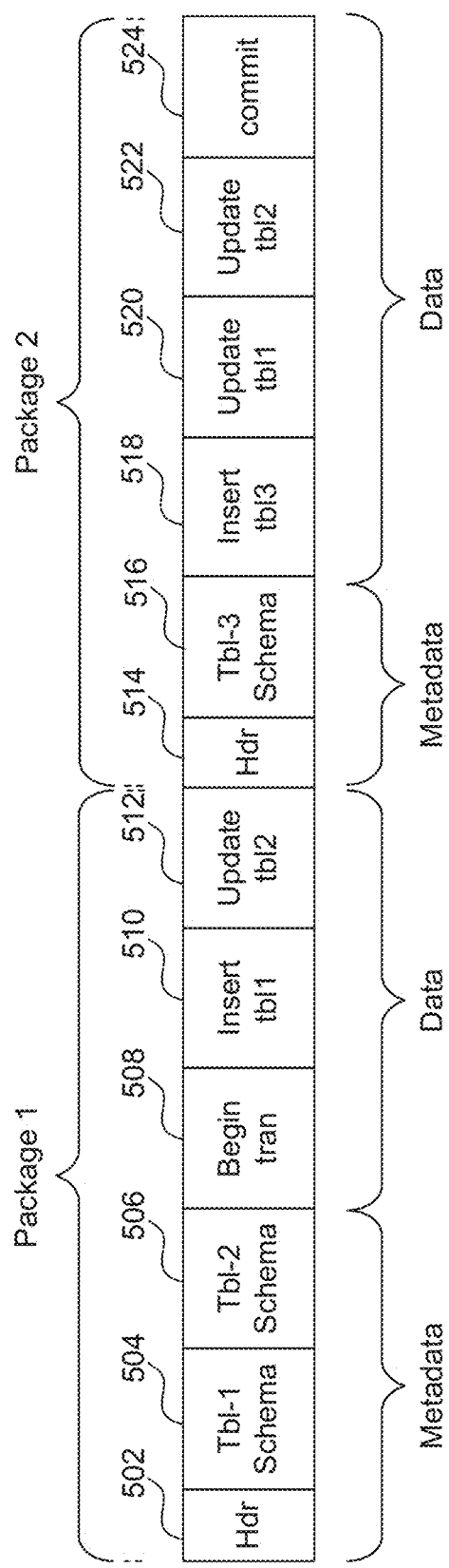
FIG. 5 is a diagram illustrating an example of a container data structure configured to include any number of elements, according to some embodiments.

FIG. 5 is a diagram illustrating an example of a container data structure configured to include any number of elements, according to some embodiments.

As shown in FIG. 5, as an example of user data in a pool element, packages may include a header, additional metadata, and other data (object or user data). While headers may be of fixed size, depending on implementation, other metadata fields and data objects may be of practically any size. Elements and their corresponding packages may be dynamically sized in DT pools. Such dynamic sizing may be facilitated by the msize field (see FIG. 4 and accompanying description above).

Package 1 and Package 2, as shown in FIG. 5, show but one non-limiting example of differently-sized packages within a package pool 500 (a pool containing packages) that supports memory management via dynamic tiering pools. However, the number actual combinations of different sized fields is practically limitless within the scope of this disclosure and the enhanced techniques described herein.

Additional features of DT pools may include: age-based eviction or purging, to make dynamic sizing work more aggressively; and lock-free mechanisms to facilitate sharing.

Some implementations of memory management via DT pools may support a specific eviction strategy of fading by age. As mentioned above and depicted in FIG. 3B, some embodiments may operate by keeping some pools sorted by relative age of each element. For example, each element may have a timestamp ts, which may be set or updated when an element is inserted into (attached to or bound to) a pool. The timestamp, in this example, thus indicates how long an element has been resident in its current pool.

In some embodiments in which a DT pool is implemented as a linked list, for example, the address of the first element in the pool may then be returned to the requesting client, so that the client may then put an object on the head of the list of the target DT pool, following which, the elements in that pool may then be automatically sorted by their timestamps. As longevity of some elements within a pool increases, this fact may serve as an indication that workload of the pool is decreasing or has decreased to a lighter level. At this point, it may be advantageous to allow some elements to fade out from the pool, such as after a predetermined timeout period.

DT pool may have a timeout setting (timeout), which may be referenced for purging elements based on age. A client may call dt_pool_purge to remove elements older than timeout value. Further, to do a one-off purge of more elements, smaller timeout values may be passed to dt_pool_purge. This may further facilitate memory control.

Regarding mechanisms to facilitate making pools more sharable, in many cases, a pool or cache may be accessed by multiple threads. DT pool may implement its synchronization via a lock-free mechanism. When creating a DT pool, a client may set a property or attribute to determine whether or not the pool is to be sharable according to its usage, in some embodiments. If a pool may be in contention by various processes trying to access it simultaneously, locks may be helpful in providing order to accesses and protect the pool from contention and/or improper accesses out of their proper order. However, if a pool is not expected to be concurrently accessed by multiple threads, it may not be necessary to protect the pool in this way. Eliminating such locks may significantly improve performance when the pool is accessed. To make the pool sharable or not sharable, some embodiments may implement a flag, for each pool, corresponding to a certain property or attribute (DT_POOL_ATTR_SHARED) to set or unset per-pool sharability of each pool.

In some embodiments, DT pool may utilize atomic compare-and-swap (CAS) operations to implement its protection mechanism. CAS may be implemented as an atomic instruction to achieve synchronization in multithreading architectures. CAS may compare the contents of a memory location with a given value and, only if they are the same, may modify the contents of that memory location to a new given value. This may be done as a single atomic operation.

Applicable CAS operations may be supported on practically any computing platforms, such as UNIX-like operating systems including BSD-based systems, systems built around a Linux kernel, commercial products such as HP-UX, AIX, and Solaris, to name a few non-limiting examples, as well as other types of systems, including Windows NT or DOS-based systems, for example.

For purposes of implementing CAS, a semantic lock may be built in accordance with the example of Table 3, such as using C-language preprocessor directives, to show a non-limiting example. In other embodiments, such CAS operations may be implemented using other code, pseudocoele, or algorithms, for example.

TABLE 3

| | |
|---|---|
| #define XLOCK_FREE | 0 /* The lock is unlocked */ |
| #define XLOCK_BUSY | 1 /* The lock is locked */ |
| #define XLOCK_LOCK(lv) | while (CAS32(&(lv), XLOCK_FREE, \ XLOCK_BUSY) != XLOCK_FREE) |
| #define XLOCK_UNLOCK(lv) | lv = XLOCK_FREE; |

When the attribute DT_POOL_ATTR_SHARED is set for a pool, accesses to it may acquire its XLOCK, and when an access is done, the XLOCK may be released. This may be regarded as a more lightweight implementation of lock operations similar to various locking operations POSIX threads (pthread lock operations), for example. However, any other locking mechanism may be implemented or used within the spirit of this disclosure.

The exemplary embodiments, arrangements, and configurations depicted in FIGS. 1-5 and Tables 1-3, along with accompanying disclosures set forth above and herein, are not intended in any way to be limiting characterizations of the scope of the claims submitted herewith, but rather to describe by way of example the variety and flexibility of possible configurations with which the enhanced memory management techniques described herein may be implemented, Non-limiting examples of these enhanced techniques are further described in more detail via additional embodiments referencing figures described below. For example, method 600 of FIG. 6 shall be described with reference to any of FIGS. 1, 2, 3A, 3B, and/or 7. However, method 600 is not limited to those example embodiments.

Figure 6:
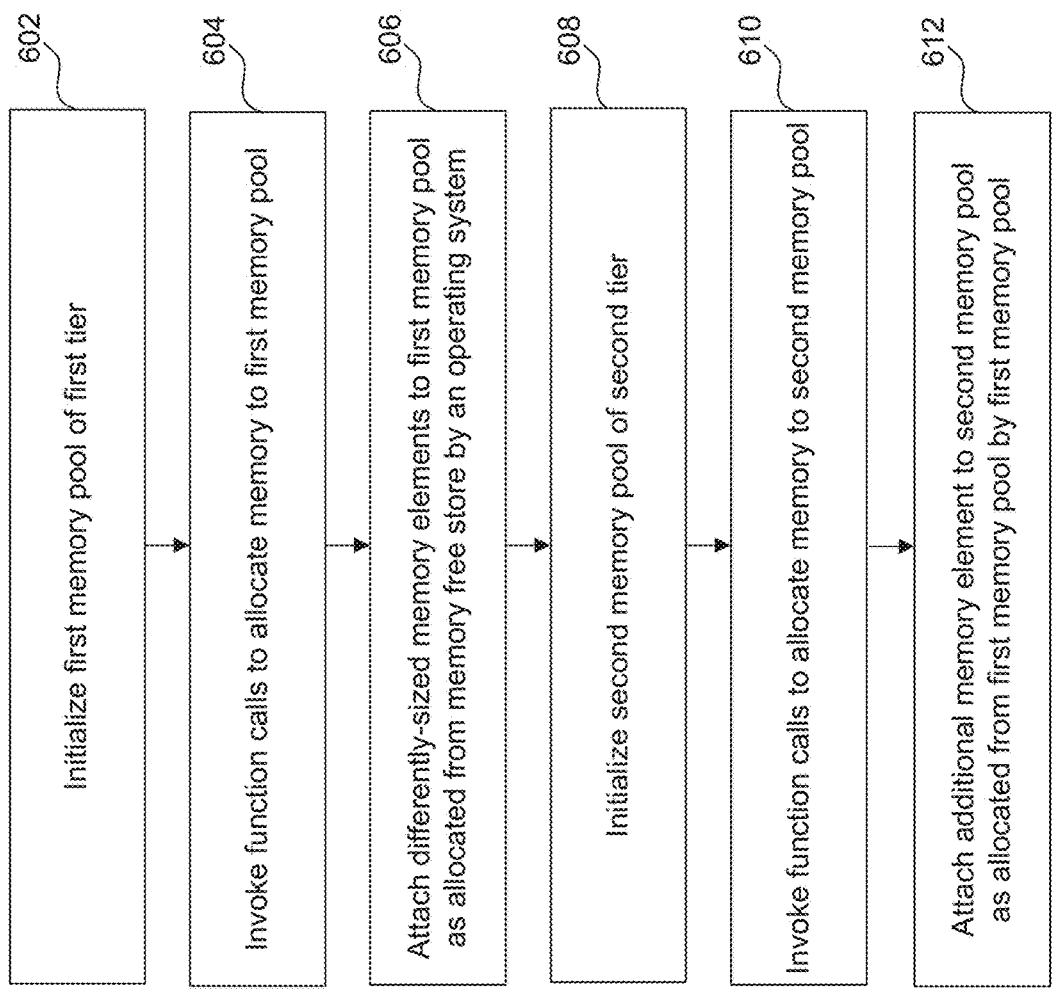
FIG. 6 is a flowchart illustrating a process for employing memory management via dynamic tiering pools, according to some embodiments.

FIG. 6 is a flowchart illustrating a method 600 for employing memory management via dynamic tiering pools, according to some embodiments.

Method 600 may be performed by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the enhanced techniques of the disclosure provided herein. Further, some of the steps may be performed simultaneously, or in a different order from that shown in FIG. 6, as will be understood by a person of ordinary skill in the art.

In 602, at least one processor, such as processor 704, may initialize first memory pool of first tier. In some embodiments, this may more specifically refer to initializing the first memory pool and associating it with a first tier of memory pools, setting this association as a parameter to an initialization function at initialization time, automatically provisioning the first memory pool as being associated with the first tier of memory pools if no other pools are present in any tier, or some combination of the above, to name a few non-limiting examples. The initialization function, such as dt_pool_init, may be called manually or automatically, with or without parameters, for execution by, e.g., processor 704.

In 604, a processor may invoke function calls to allocate memory to first memory pool. More specifically, there may be a first function call and a second function call, and they may have the same parameters or be called to perform the same task for each, in some use cases and in embodiments. These function calls may be included with pool initialization functions, may be included with other DT pool functions, e.g., dt_pool_get, may be system calls included with certain operating systems, or some combination of the above, to name a few non-limiting examples. Similarly, such function calls may be called manually or automatically, with or without parameters, for execution by, e.g., processor 704, according to some embodiments.

In 606, a processor may attach differently-sized memory elements to first memory pool as allocated from a memory free store by an operating system. Per 604 above, the operating system may have allocated any of a first memory element and a second memory element from the free store, which may be managed by the operating system. Thus, at 606, the allocated memory elements may each be attached to a specific pool. This attachment (binding) may be performed, in some embodiments, by way of a specific function call, such as dt_pool_attach described above, by another function call, such as part of an initialization function, allocation function, system call, or combination of the above, to name a few non-limiting examples.

In 608, a processor may initialize a second memory pool of second tier, in some embodiments, this may more specifically refer to initializing the second memory pool and associating it with a second tier of memory pools, setting this association as a parameter to an initialization function at initialization time, automatically provisioning the second memory pool as being associated with the second tier of memory pools if no other pools are present in any tier, or some combination of the above, to name a few non-limiting examples. The initialization function, such as dt_pool_init, may be called manually or automatically, with or without parameters, for execution by, e.g., processor 704, in some embodiments, In 610, a processor may invoke function calls to allocate memory to the second memory pool. More specifically, there may be a third function call, and in some embodiments, a fourth function call, and they may have the same parameters or be called to perform the same task for each, in some use cases. As a result, a third memory element, if not a fourth memory element, may be allocated for attachment to the second memory pool. These function calls may be included with pool initialization functions, may be included with other DT pool functions, e.g., dt_pool_get, may be system calls included with certain operating systems, or some combination of the above, to name a few non-limiting examples. Similarly, such function calls may be called manually or automatically, with or without parameters, for execution by, e.g., processor 704.

In 612, a processor may attach additional memory elements) to second memory pool as allocated from first memory pool by first memory pool. Per 610 above, the first memory pool may have allocated any of a third memory element, if not a fourth memory element, from the free store, which may be managed by the operating system. Thus, at 612, the allocated memory elements may each be attached to a specific pool. This attachment (binding) may be performed, in some embodiments, by way of a specific function call, such as dt_pool_attach described above, by another function call, such as part of an initialization function, allocation function, system call, or any combination of the above, to name a few non-limiting examples.

This allocation and attachment may be determined by properties specific to the second tier of memory pools. Additionally, or alternatively, these properties affecting allocation and/or attachment may, in some embodiments, be determined by the first tier of memory pools, including by inheritance at the second tier of memory pools. Additionally, in similar manner, behavior of subsequent resizing, recycling, reallocation, and/or deallocation may also be determined by tier-specific properties, inherited properties, or other system settings, such as per operating system, database replication system, framework, server, etc.

Used at least in accordance the enhanced memory management techniques described herein, DT pool may serve to improve performance and efficiency of dynamically allocated memory in a variety of use cases. For example, favorable results may be seen in a use case of managing memory of a database replication server when handling large numbers of replication paths, in some embodiments. More generally, such enhanced memory management techniques employing shareable dynamic tiering pools, may yield significant improvements in performance and efficiency (reduced memory footprint) when replication workloads are different for different paths and vary over the course of their runtime.

For example, with specific values for a given configuration, a test may be run with the following settings, in one non-limiting embodiment. One may set an upper boundary of total memory that may be used for persistent queue across any pools to 2000 MB. For DT pools, a value of 10 MB may be set for init_size. By comparison, a pool size for a system running static pools (fixed-size pools) may be set to 100 MB for each replication path. Table 4 lists memory usage of replication with these different pool types:

TABLE 4

| | Memory Usage (MB) | | | |
|---|---|---|---|---|
| | Fixed-Size Pool (Static Pool) | | Dynamic Tiering Pool (DT Pool) | |
| Number of Replication Paths | Idle/Light Workload | Heavy Workload | Idle/Light Workload | Heavy Workload |
| 1 | 100 | 100 | 10 | 2000 |
| 5 | 500 | 500 | 50 | 2000 |
| 10 | 1000 | 1000 | 100 | 2000 |
| 15 | 1500 | 1500 | 150 | 2000 |
| 70 | 2000 | 2000 | 200 | 2000 |
| 30 | N/A | N/A | 300 | 2000 |

The data of Table 4 show that regardless of the workload in the system, the memory usage of original pool may be better suited to the workload when using DT pools, whereas with static pools, memory may be underutilized or overburdened more often than not. When the system is idle, static pools may consume too much memory. When all replication paths are busy, static pools may not scale up to the system's capacity, e.g., for less than 20 paths.

Also, with the fixed memory sizes for pools, if the product of the fixed pool size and number of replication paths exceed the upper limit of pool memory in the system, then the system may not support any additional replication paths without manually reducing the pool size of some or all replication paths.

By contrast, the memory usage of DT pools may automatically adjust along with current workload in the system. When there is only a light workload from only a small amount of data being replicated, the total pools' memory footprint may be small. When the system becomes busy, with any number of replication paths, then the DT pools may fully utilize available memory for user data to be replicated, which may therefore result in the system overall providing better throughput for replication.

Other embodiments using these enhanced techniques may similarly apply some or all of the enhanced techniques herein to caches, together with or separately from the techniques applied with DT pools in the same systems, for example, without departing from the scope or spirit of this disclosure. Any additional benefits of these techniques may also be apparent to persons having ordinary skill in the art.

Figure 7:
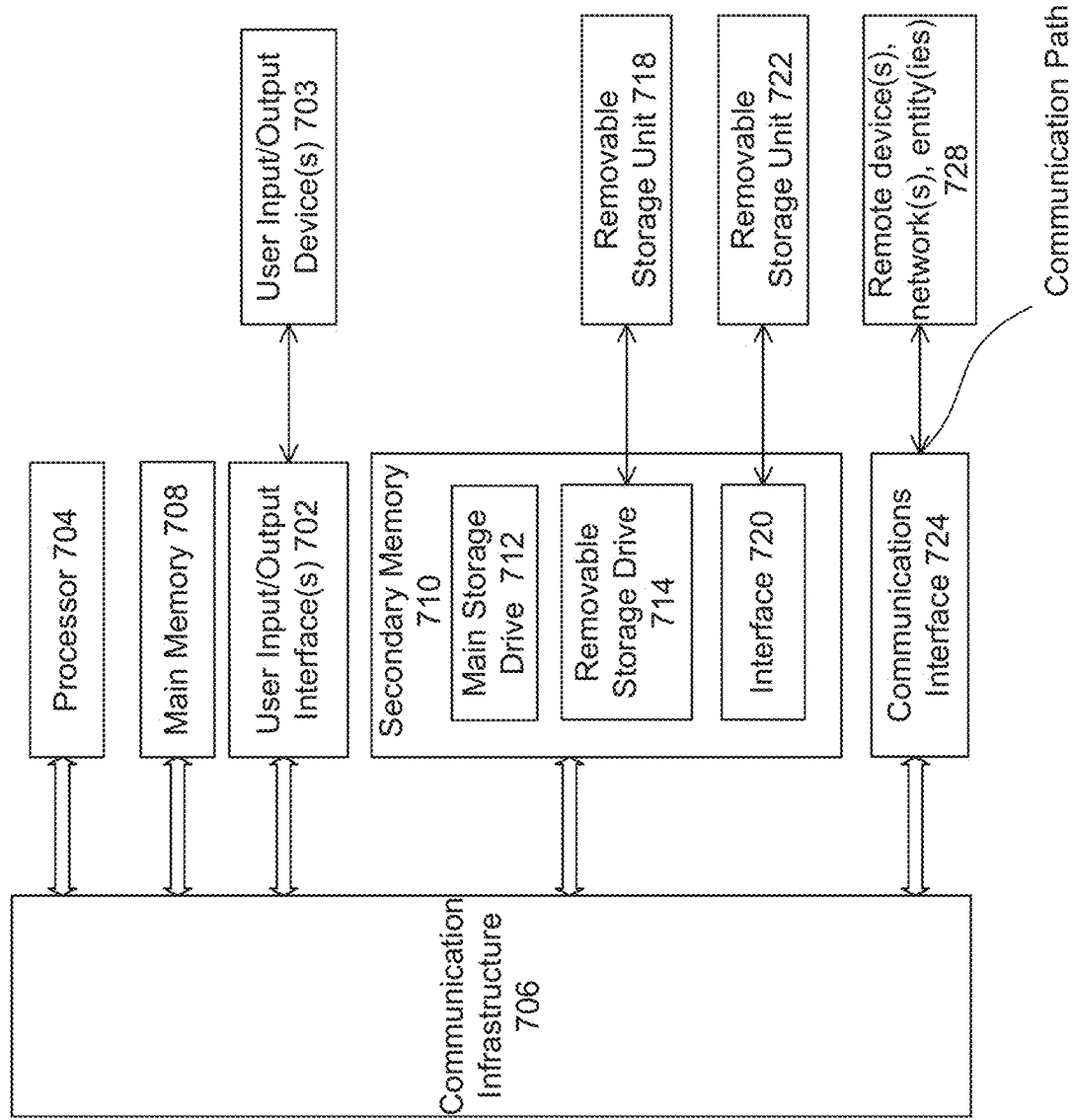
FIG. 7 is an example computer system useful for implementing various embodiments.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a bus or communication infrastructure 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, vector processing, array processing, etc., as well as cryptography (including brute-force cracking), generating cryptographic hashes or hash sequences, solving partial hash-inversion problems, and/or producing results of other proof-of-work computations for some blockchain-based applications, for example.

Additionally, one or more of processors 704 may include a coprocessor or other implementation of logic for accelerating cryptographic calculations or other specialized mathematical functions, including hardware-accelerated cryptographic coprocessors. Such accelerated processors may further include instruction set(s) for acceleration using coprocessors and/or other logic to facilitate such acceleration.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or secondary memory 710. Secondary memory 710 may include, for example, a main storage drive 712 and/or a removable storage device or drive 714. Main storage drive 712 may be a hard disk drive or solid-state drive, for example. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communication path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet of Things (IoT), and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software (e.g., "on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), database as a service (DBaaS), etc.); and/or a hybrid model including any combination of the foregoing examples or other services or delivery paradigms.

Any applicable data structures, file formats, and schemas may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

Any pertinent data, files, and/or databases may be stored, retrieved, accessed, and/or transmitted in human-readable formats such as numeric, textual, graphic, or multimedia formats, further including various types of markup language, among other possible formats. Alternatively or in combination with the above formats, the data, files, and/or databases may be stored, retrieved, accessed, and/or transmitted in binary, encoded, compressed, and/or encrypted formats, or any other machine-readable formats.

Interfacing or interconnection among various systems and layers may employ any number of mechanisms, such as any number of protocols, programmatic frameworks, floorplans, or application programming interfaces (API), including but not limited to Document Object Model (DOM), Discovery Service (DS), NSUserDefaults, Web Services Description Language (WSDL), Message Exchange Pattern (MEP), Web Distributed Data Exchange (WDDX), Web Hypertext Application Technology Working Group (WHATWG) HTML5 Web Messaging, Representational State Transfer (REST or RESTful web services), Extensible User Interface Protocol (XUP), Simple Object Access Protocol (SOAP), XML Schema Definition (XSD), XML Remote Procedure Call (XML-RPC), or any other mechanisms, open or proprietary, that may achieve similar functionality and results.

Such interfacing or interconnection may also make use of uniform resource identifiers (URI), which may further include uniform resource locators (URL) or uniform resource names (URN). Other forms of uniform and/or unique identifiers, locators, or names may be used, either exclusively or in combination with forms such as those set forth above.

Any of the above protocols or APIs may interface with or be implemented in any programming language, procedural, functional, or object-oriented, and may be compiled or interpreted. Non-limiting examples include C, C++, C #, Objective-C, Java, Swift, Go, Ruby, Perl, Python, JavaScript, WebAssembly, or virtually any other language, with any other libraries or schemas, in any kind of framework, runtime environment, virtual machine, interpreter, stack, engine, or similar mechanism, including but not limited to Node js, V8, Knockout, jQuery, Dojo, Dijit, OpenUI5, AngularJS, Express.js, Backbone.js, Ember. js, DHTMLX, Vue, React, Electron, and so on, among many other non-limiting examples.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7, In particular, embodiments may operate with software, hardware, and/or operating system implementations other than those described herein.

It is to be appreciated that the Detailed Description section, and not any other section, is intended to be used to interpret the claims. Other sections may set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, steps, operations, methods, etc. using orderings different from those described herein.

References herein to "one embodiment," "an embodiment," "an example embodiment," "some embodiments," or similar phrases, indicate that the embodiment described may include a particular feature, structure, or characteristic, but every embodiment may not necessarily include the particular feature, structure, or characteristic. Moreover, such phrases are not necessarily referring to the same embodiment.

Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

We claim:

1. A computer-implemented method, comprising:

performing, by at least one processor, a database replication across a plurality of database-replication paths, wherein to perform the database replication across the plurality of database-replication paths, the method further comprises:

initializing, by the at least one processor, a first memory pool of a first tier;

invoking, by the at least one processor, a first function call and a second function call, each configured to instruct the at least one processor to allocate memory to the first memory pool;

responsive to the first and second function calls, allocating, by the at least one processor, a first memory element and a second memory element, respectively, from a memory free store, for attachment to the first memory pool, wherein the first memory element has a first size, and the second memory element has a second size different from the first size, and wherein the memory free store is managed by an operating system running on the at least one processor, responsive to a number of replication paths of the plurality of replication paths, and responsive to at least one of an amount of a workload or a quantity of available processing resources;

initializing, by the at least one processor, a second memory pool of a second tier, wherein the second tier inherits at least one property from the first tier, in a hierarchy of tiers, wherein the initializing of the first memory pool of the first tier comprises invoking a constructor function to construct a first memory-pool header corresponding to the first memory element, wherein the first memory-pool header comprises one or more first flags corresponding to a first set of properties comprising the at least one property, and wherein the first memory-pool header comprises a first shim configured to link the first memory element to a first additional data structure, and wherein the initializing of the second memory pool of the second tier comprises invoking the constructor function to construct a second memory-pool header corresponding to the second memory element, wherein the second memory-pool header comprises one or more second flags corresponding to a second set of properties, and wherein the second memory-pool header comprises a second shim configured to link the second memory element to a second additional data structure;

invoking, by the at least one processor, a third function call configured to instruct the at least one processor to allocate memory to the second memory pool; and responsive to the third function call, reallocating, by the at least one processor, the second memory element from the first memory pool, for attachment to the second memory pool.

2. The method of claim 1, further comprising:

invoking, by the at least one processor, a fourth function call configured to instruct the at least one processor to allocate memory to the second memory pool;

in response to the fourth function call, determining, by the at least one processor, that the first memory pool lacks sufficient memory to reallocate; and responsive to the determining, allocating, by the at least one processor, a third memory element, to the second memory pool, from the memory free store managed by the operating system.

3. The method of claim 2, further comprising:

in response to a decrease in the workload, performing, by the at least one processor, at least one of: resizing the second memory element, resizing the third memory element, freeing the second memory element, freeing the third memory element, or destroying the second memory pool.

4. The method of claim 1, wherein the first tier comprises the first set of properties, comprising the at least one property, to be set in any memory pool associated with the first tier, wherein the second tier comprises the second set of properties to be set in any memory pool associated with the second tier, and wherein the second set of properties is defined by inheritance from the first set of properties to be a superset of the first set of properties.

5. The method of claim 1, wherein at least one of the first tier or the second tier may be shared across the plurality of database-replication paths via a lock-free mechanism.

6. The method of claim 5, wherein the lock-free mechanism comprises a compare-and-swap (CAS) operation.

7. The method of claim 1, wherein the reallocating the second memory element from the first memory pool for attachment to the second memory pool further comprises sharing, by the at least one processor, the second memory element between the first memory pool and the second memory pool, based at least in part on the hierarchical relationship between the first tier and the second tier, the first memory pool being a parent of the second memory pool, or a combination thereof.

8. The method of claim 1, further comprising automatically evicting, by the at least one processor, the first memory element from the pool after a predetermined timeout period having elapsed since attachment of the first memory element to the first memory pool.

9. A system, comprising:

a memory; and at least one processor, coupled to the memory, and configured to:

perform a database replication across a plurality of database-replication paths, wherein to perform the database replication across the plurality of database-replication paths, the at least one processor is further configured to:

initialize a first memory pool, wherein the first memory pool is associated with a first tier of memory pools;

invoke a first function call, wherein the first function call is configured to instruct the at least one processor to allocate memory to the first memory pool;

in response to the first function call, allocate a first memory element from a memory free store, for attachment to the first memory pool, wherein the first memory element has a first size, and wherein the memory free store is managed by an operating system running on the at least one processor, responsive to a number of database-replication paths of the plurality of database-replication paths, and responsive to at least one of an amount of a workload or a quantity of available processing resources;

invoke a second function call, wherein the second function call is configured to instruct the at least one processor to allocate memory to the first memory pool;

in response to the second function call, allocate a second memory element from the memory free store managed by the operating system, for attachment to the first memory pool, wherein the second memory element has a second size, and wherein the second size is different from the first size;

initialize a second memory pool, wherein the second memory pool is associated with a second tier of memory pools, wherein the second tier inherits at least one property from the first tier, in a hierarchy of tiers, wherein the initializing of the first memory pool of the first tier comprises invoking a constructor function to construct a first memory-pool header corresponding to the first memory element, wherein the first memory-pool header comprises one or more first flags corresponding to a first set of properties comprising the at least one property, and wherein the first memory-pool header comprises a first shim configured to link the first memory element to a first additional data structure, and wherein the initializing of the second memory pool of the second tier comprises invoking the constructor function to construct a second memory-pool header corresponding to the second memory element, wherein the second memory-pool header comprises one or more second flags corresponding to a second set of properties, and wherein the second memory-pool header comprises a second shim configured to link the second memory element to a second additional data structure;

invoke a third function call, wherein the third function call is configured to instruct the at least one processor to allocate memory to the second memory pool; and in response to the third function call, reallocate the second memory element from the first memory pool, for attachment to the second memory pool.

10. The system of claim 9, wherein the at least one processor is further configured to:

invoke a fourth function call, wherein the fourth function call is configured to instruct the at least one processor to allocate memory to the second memory pool;

in response to the fourth function call, determine that the first memory pool lacks sufficient memory to reallocate; and in response to the determining, allocate a third memory element, to the second memory pool from the memory free store managed by the operating system.

11. The system of claim 10, wherein the at least one processor is further configured to:

in response to a decrease in the workload, perform at least one of: resizing the second memory element, resizing the third memory element, freeing the second memory element, freeing the third memory element, or destroying the second memory pool.

12. The system of claim 9, wherein at least one of the first tier of memory pools or the second tier of memory pools may be shared across the plurality of database-replication paths via a lock-free mechanism.

13. The system of claim 12, wherein the lock-free mechanism comprises a compare-and-swap (CAS) operation.

14. A non-transitory computer-readable storage medium having instructions stored thereon that, when executed by at least one computing device, cause the at least one computing device to perform operations comprising:

performing a database replication across a plurality of database-replication paths, wherein to perform the database replication across the plurality of database-replication paths, the operations further comprise:

initializing a first memory pool, wherein the first memory pool is associated with a first tier of memory pools;

invoking a first function call, wherein the first function call is configured to instruct the at least one processor to allocate memory to the first memory pool;

in response to the first function call, allocating a first memory element from a memory free store, for attachment to the first memory pool, wherein the first memory element has a first size, and wherein the memory free store is managed by an operating system running on the at least one processor, responsive to a number of database-replication paths of the plurality of database-replication paths, and responsive to at least one of an amount of a workload or a quantity of available processing resources;

invoking a second function call, wherein the second function call is configured to instruct the at least one processor to allocate memory to the first memory pool;

in response to the second function call, allocating a second memory element from the memory free store managed by the operating system, for attachment to the first memory pool, wherein the second memory element has a second size, and wherein the second size is different from the first size;

initializing a second memory pool, wherein the second memory pool is associated with a second tier of memory pools, wherein the second tier inherits at least one property from the first tier, in a hierarchy of tiers, wherein the initializing of the first memory pool of the first tier comprises invoking a constructor function to construct a first memory-pool header corresponding to the first memory element, wherein the first memory-pool header comprises one or more first flags corresponding to a first set of properties comprising the at least one property, and wherein the first memory-pool header comprises a first shim configured to link the first memory element to a first additional data structure, and wherein the initializing of the second memory pool of the second tier comprises invoking the constructor function to construct a second memory-pool header corresponding to the second memory element, wherein the second memory-pool header comprises one or more second flags corresponding to a second set of properties, and wherein the second memory-pool header comprises a second shim configured to link the second memory element to a second additional data structure;

invoking a third function call, wherein the third function call is configured to instruct the at least one processor to allocate memory to the second memory pool; and in response to the third function call, reallocating the second memory element from the first memory pool, for attachment to the second memory pool.

15. The computer-readable storage medium of claim 14, the operations further comprising:

invoking a fourth function call, wherein the fourth function call is configured to instruct the at least one processor to allocate memory to the second memory pool;

in response to the fourth function call, determining that the first memory pool lacks sufficient memory to reallocate; and in response to the determining, allocating a third memory element, to the second memory pool from the memory free store managed by the operating system.

16. The computer-readable storage medium of claim 15, the operations further comprising:

in response to a decrease in the workload, performing at least one of resizing the second memory element, resizing the third memory element, freeing the second memory element, freeing the third memory element, or destroying the second memory pool.

17. The computer-readable storage medium of claim 14, wherein the first tier of memory pools comprises the first set of properties, comprising the at least one property, to be set in any memory pool associated with the first tier of memory pools, wherein the second tier of memory pools comprises the second set of properties to be set in any memory pool associated with the second tier of memory pools, and wherein the second set of properties is defined by inheritance from the first set of properties to be a superset of the first set of properties.

18. The computer-readable storage medium of claim 14, wherein at least one of the first tier of memory pools or the second tier of memory pools may be shared across the plurality of database-replication paths via a lock-free mechanism.

19. The computer-readable storage medium of claim 18, wherein the lock-free mechanism comprises a compare-and-swap (CAS) operation.

20. The computer-readable storage medium of claim 14, wherein the reallocating the second memory element from the first memory pool for attachment to the second memory pool further comprises sharing the second memory element between the first memory pool and the second memory pool, memory pool, based at least in part on the hierarchical relationship between the first tier and the second tier, the first memory pool being a parent of the second memory pool, or a combination thereof.

\* \* \* \* \*